(12) United States Patent
Weisgerber et al.

(10) Patent No.: US 10,068,169 B2
(45) Date of Patent: Sep. 4, 2018

(54) ANTENNA DEVICE, RADIO IDENTIFICATION SYSTEM AND METHOD FOR EMITTING A RADIO SIGNAL

(71) Applicant: Fraunhofer-Gesellschaft zur Foerderung der angewandten Forschung e.V., Munich (DE)

(72) Inventors: Lars Weisgerber, Ebersbach-Neugersdorf (DE); Wolfram Strauss, Nuremberg (DE); Mario Schuehler, Effeltrich (DE); Alexander Popugaev, Erlangen (DE); Rainer Wansch, Baiersdorf (DE); Josef Bernhard, Nabburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/593,616

(22) Filed: May 12, 2017

(65) Prior Publication Data

US 2017/0249546 A1    Aug. 31, 2017

Related U.S. Application Data

(63) Continuation of application No. PCT/EP2015/073663, filed on Oct. 13, 2015.

(30) Foreign Application Priority Data

Nov. 14, 2014  (DE) .................. 10 2014 223 328

(51) Int. Cl.
*G06K 19/077* (2006.01)
*H01Q 1/22* (2006.01)
(Continued)

(52) U.S. Cl.
CPC ..... *G06K 19/07773* (2013.01); *G06K 7/10356* (2013.01); *G06K 19/0723* (2013.01);
(Continued)

(58) Field of Classification Search
None
See application file for complete search history.

(56) References Cited

U.S. PATENT DOCUMENTS

| 2002/0085643 A1 | 7/2002 | Kitchener et al. |
| 2004/0157645 A1 | 8/2004 | Smith et al. |

(Continued)

FOREIGN PATENT DOCUMENTS

| DE | 10257757 A1 | 9/2004 |
| DE | 102010020531 A1 | 11/2011 |

(Continued)

OTHER PUBLICATIONS

Lee, et al., "Wide-Coverage Array Antenna Using a Dual-Beam Switching for UHF RFID Applications", 2013 IEEE International Conference on RFID, Apr. 30-May 2, 2013, pp. 36-44.
(Continued)

*Primary Examiner* — Kristy A Haupt
(74) *Attorney, Agent, or Firm* — Perkins Coie LLP; Michael A. Glenn

(57) ABSTRACT

An antenna device has a radiating unit having a plurality of antennas, configured to emit a radio signal with a radiation pattern. In addition, the antenna device has a calculator configured to generate and to apply to the plurality of antennas a plurality of feed signals based on an identification signal provided in order to generate the radio signal. The calculator is additionally configured to control the feed signals in a time-varying manner so that the radio signal is emitted with a time-varying radiation pattern.

20 Claims, 13 Drawing Sheets

(51) Int. Cl.
*H01Q 3/26* (2006.01)
*G06K 7/10* (2006.01)
*G06K 19/07* (2006.01)
*H04W 64/00* (2009.01)

(52) U.S. Cl.
CPC ......... *H01Q 1/2216* (2013.01); *H01Q 3/2682* (2013.01); *H04W 64/003* (2013.01)

(56) References Cited

U.S. PATENT DOCUMENTS

2005/0110641 A1  5/2005  Mendolia et al.
2009/0086648 A1  4/2009  Xu et al.

FOREIGN PATENT DOCUMENTS

| GB | 2496821 A | 5/2013 |
| WO | 2008/067972 A1 | 6/2008 |
| WO | 2014/057167 A1 | 4/2014 |

OTHER PUBLICATIONS

Weisgerber, L. et al., "Multibeam antenna array for RFID applications", in Proc. of the 43rd European Microwave, Conference (EuMC), Nuremberg, Germany, Oct. 6-10, 2013, pp. 84-87.

ically be used so far (1 gate-1# ANTENNA DEVICE, RADIO IDENTIFICATION SYSTEM AND METHOD FOR EMITTING A RADIO SIGNAL

CROSS-REFERENCE TO RELATED APPLICATIONS

This application is a continuation of copending International Application No. PCT/EP2015/073663, filed Oct. 13, 2015, which claims priority from German Application No. 102014223328.3, filed Nov. 14, 2014, which are each incorporated herein in its entirety by this reference thereto.

BACKGROUND OF THE INVENTION

The present invention relates to an antenna device for emitting a radio identification signal, to a radio identification system and to a method for emitting a radio signal, like a radio identification or radio frequency identification (RFID) signal. In addition, the present invention relates to an RFID antenna including autonomous beam shaping.

In logistics, radio-frequency transponders or radio frequency identification (RFID) transponders which allow objects to be identified are more frequently used. Typically, these transponders are passive, but they may also be active. The transponders are excited by a radio-frequency electromagnetic field. The transponder makes use of this signal and transmits a modulated signal back to the reading station as a response to exciting. Information of the transponder which can be evaluated by the reading station are contained in the response signal. Thus, an object may be identified and associated unambiguously using a transponder.

Logistics processes, like identifying objects on a pallet, can be handled and optimized using this radio-frequency identification of objects. When a very large number of objects including transponders are located on a pallet, all the transponders can be read out and, consequently, all the objects can be identified within a certain time by a specific reading process. This allows an automatic detection of objects.

Today's systems, as used when passing gates or in displacing units, include a reading unit having one to four terminals to which a respective antenna may be connected. The radio-frequency excitation signal is emitted via the antenna(s) and the response signals of the transponders are received. With reading stations having a single terminal, single antennas have typically been used so far (1 gate–1 single antenna). Reliable detection of a large number of tags (transponders) here means longer a detection duration than when using several antennas, since a large number of collisions between the response signals may result and spatial filtering is not possible. In addition, the detection region (so-called visual or reading range) is considerably smaller compared to using several antennas and the respective gate number of readers and/or the number of readers. With regard to reading units having several gates, one gate each is connected to an antenna. When reading many transponders, the antennas within the reading unit are switched sequentially. This allows achieving a higher reading rate of transponders, which corresponds to a reduced detection duration. Increasing the reading rate, however, is dependent on the arrangement of the antennas. In order to make use of spatial filtering, the antennas are to be arranged in the most distributed manner possible so that the directional patterns thereof correlate only slightly and, thus, complementary space regions may be covered. The distributed arrangement here causes high space requirements.

Apart from distributing several antennas, spatial filtering may alternatively be realized by a feed network, for example by a Butler matrix, as is described in [1]. FIG. 11a shows an exemplarily total set up of a multi-beam antenna. FIG. 11b shows a realization of a feed network including a Butler matrix. Depending on which input gate of the network the excitation signal is applied to, a directional pattern oriented in a certain spatial direction will form. The feed network here distributes the input signal over all the antennas available connected at the output. The directional pattern of the antenna may thus be shaped by the respective phase and amplitude occupancy caused by the feed network. This type of antenna is called multi-beam antenna. In order to be able to make use of this type of spatial filtering with existing solutions, reading units having several antenna terminals are to be used, which cause considerably higher costs than apparatuses having a single antenna terminal.

With known solutions, switching between the single beams takes place by means of an interface, that is an external device, typically sensors for position identification of the pallet+external interface, determines the beam manifestation.

In further known systems, a number of antennas which are driven via specially configured reading systems are distributed over a total cover region. However, this is not a multi-beam system. Using standard reading units is not possible here so that the result is increased costs as regards complexity of the reading units and the distributed arrangement of the antennas.

Further known solutions offer a multi-beam solution including beam shaping. A high number of antenna beams which are simply connected to be active one after the other can be generated, however, the antennas are implemented to be so-called "leaky wave" antennas and limited strongly in their frequency domain. In addition, the directional pattern of the single antenna changes with a changing drive frequency so that the operating range of the device is limited.

Consequently, a concept would be desirable using which an efficient identification of radio identification transponders, which may be realized with little additional complexity relative to existing readers, can be obtained.

An object of the present invention is providing an antenna device which increases an identification rate and the visual or reading range of existing radio identification reading units with only little modification complexity compared to known antenna systems.

Another object of the present invention is providing a concept which allows increasing a rate of information relative to the detected radio identification transponders detected by a radio identification reader.

SUMMARY

According to an embodiment, an antenna device may have: radiating means having a plurality of antennas, configured to emit a radio signal with a radiation pattern; and calculating means configured to generate and apply to the plurality of antennas a plurality of feed signals based on an identification signal provided in order to generate the radio signal; wherein the calculating means is further configured to control the feed signals in a time-varying manner in order to emit the radio signal with a time-varying radiation pattern; and wherein the calculating means has a terminal and is configured to obtain the identification signal from an external radio identification reader at the terminal.

According to another embodiment, a radio identification system may have: an antenna device as mentioned above, wherein the radiating means is configured to receive a response signal transmitted by a transponder device responsive to the radio signal, and wherein the calculating means is configured to determine, based on evaluating the response signal and the radiation pattern with which the radio signal has been transmitted, a presence of the transponder device in a sub-region of a detection region of the radiating means, wherein the sub-region is associated to the radiation pattern, and wherein the calculating means is additionally configured to provide position information indicating the presence of the transponder device in the sub-region, at a signal output; and communicating means for receiving a data signal having information relating to a position of a transponder device detected by the antenna device.

According to another embodiment, a radio identification system may have: an external radio identification reader; an antenna device as mentioned above; and communicating means for providing a control signal having information relating to a temporal succession of the radiation pattern with which the radio signal is transmitted.

According to another embodiment, a method may have the steps of: obtaining an identification signal from an external radio identification reader at a terminal; emitting a radio signal which has a radiation pattern using radiating means having a plurality of antennas; generating a plurality of feed signals based on the identification signal and applying the feed signals to the plurality of antennas in order to generate the radio signal; and time-varyingly controlling the feed signals so that the radio signal is emitted with a time-varying radiation pattern.

A central idea of the present invention is having recognized that an efficient concept for detecting radio identification transponders may be provided when an antenna device comprises calculating means configured to control feed signals for applying to a plurality of antennas in a time-varying manner. The time-varyingly controlled feed signals allow obtaining a time-varying radiation pattern or characteristic of the antennas or the radio signal and a visual or reading range enlarged compared to static radiation patterns. This allows switching between radiation patterns irrespective of external units, such as interfaces, so that efficient successions of radiation patterns, that is which are time-saving and/or comprises a high identification rate, based on internal logic may be used.

Another central idea of the present invention is having recognized that position information relative to a transponder device in a sub-region of a detection region of the antenna device can be obtained when a sub-region is associated to a radiation pattern (beam) and when the calculating means is configured to evaluate a response signal of the transponder device. The presence of the transponder device in the sub-region can be determined by the calculating means determining using which radiation pattern a radio signal, which the transponder device transmits a response signal to, has been or is transmitted. The position information may be provided at a signal output located at the antenna system, such as an external device, and allows an efficient configuration of radio identification processes, such as transport direction and/or input/output controls with simultaneous identification of objects.

In accordance with an embodiment, an antenna device comprises radiating means and calculating means. The radiating means comprises a plurality of antennas configured to emit a radio signal with a radiation pattern. The calculating means is configured to generate and to apply to the plurality of antennas a plurality of feed signals based on an identification signal provided in order to generate the radio signal.

In addition, the calculating means is configured to control the feed signals in a time-varying manner so that the radio signal is emitted and received with a time-varying radiation pattern.

When the identification signal is received by an external radio identification reader, shaping of the radiation pattern may take place transparently for the external reader. This means that the external radio identification reader does not realize the difference or extended functionality and/or no adaptation thereof is required. This allows replacing previous, maybe purely passive, antennas by the antenna device so that existing reading units may exhibit an increased efficiency.

In accordance with another embodiment, the radiating means is configured to receive a response signal transmitted by a transponder device responsive to the radio signal. The calculating means is configured to determine, based on an evaluation of the response signal and the radiation pattern with which the radio signal has been transmitted, a presence of the transponder device in a sub-region of a detection region of the radiating means, wherein the sub-region is associated to the radiation pattern, and wherein the calculating means is additionally configured to provide position information indicating the presence of the transponder device in the sub-region, at a signal output.

This allows tracking a transponder device across sub-regions within the radio identification region. This implementation may also be transparent for an external radio identification reading unit when the identification signal based on which the radio signal is generated is received by it. The functionality extended compared to known antennas is provided in the antenna device so that the antenna device is combinable with existing radio identification reading units not exhibiting this functionality.

In accordance with another embodiment, the identification signal is provided by the internal radio identification reader. This allows implementing the antenna device as a radio identification reader so that an external radio identification reader can be omitted.

Further embodiments relate to radio identification systems and to a method for emitting a radio signal.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
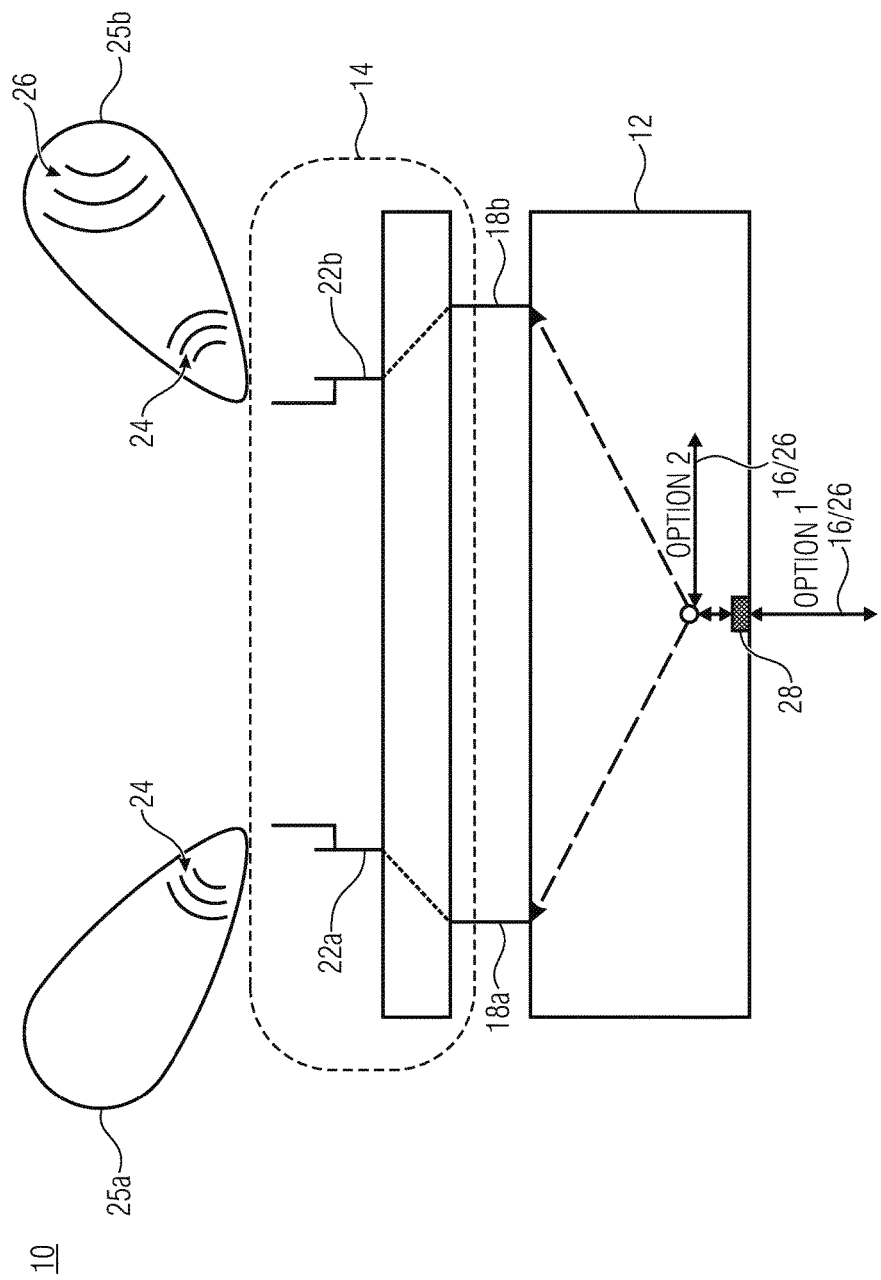
FIG. 1 is a schematic block circuit diagram of an antenna device comprising calculating means and radiating means in accordance with an embodiment.

Before discussing below in greater detail embodiments of the present invention making reference to the drawings, it is to be pointed out that identical elements, objects and/or structures or those of equal function or equal effect are provided with the same reference numerals in the different figures so that the description of these elements illustrated in different embodiments is mutually exchangeable and mutually applicable.

FIG. 1 shows a schematic block circuit diagram of an antenna device 10 comprising calculating means 12 and radiating means 14. The calculating means is configured to generate feed signals 18a and 18b for antennas 22a and 22b of the radiating means 14 based on an identification signal 16. The radiating means 14 comprises two antennas 22a and 22b, wherein the radiating means may also comprise a greater number of antennas, such as three, four, eight or more. The radiating means 14 or the antennas 22a and 22b is/are configured to generate a radio signal 24 with a radiation pattern 25a and/or 25b based on the feed signals 18a and/or 18b. The radio signal 24 consequently exhibits mutually different directional patterns in a detection region of the antenna device 10 or radiating means 14. The radiation pattern 25a and/or 25b may thus relate to an advantageous direction of propagation of the radio signal 24. At least one radiation pattern 25a or 25b may, for example, be associated to a so-called antenna beam. This means that the radio signal 24 is emitted in a sub-region of the (total) detection region detected by the antenna beam, with an advantageous propagation (signal quality). Alternatively or additionally, the directional pattern may relate also to a polarization direction of the radio signal 24. Compared to an antenna device comprising a single radiation pattern or a smaller number of radiation patterns, the total detection region may be increased, like when, with an unchanged size of the respective detection region, a sub-region is detected with each radiation pattern 25 and 25b. The result is an increased visual or reading range of the antenna device 10 compared to antenna devices having only one or a smaller number of radiation patterns.

As is indicated by option (OPT) 1, the identification signal 16 may be obtained from an external radio identification reader. The antenna device 10 may be mounted, that is arranged, as an antenna of this external radio identification reader. Alternatively or additionally, as is indicated by option (OPT) 2, the identification signal 16 may be generated by the calculating means 12. This means that the antenna device 10 may also exhibit the functionality of a radio identification reader or be implemented to be a radio identification reader. Depending on option 1 and/or 2 implemented, a response signal 26 which is received responsive to the radio signal 24 may be provided to the calculating means 12 and/or the external radio identification reader.

When a transponder device receives the radio signal 24, it generates the response signal 26 based thereon, wherein the response signal 26 may be understood to be a newly generated signal or a modulation modulated onto the radio signal 24. The radiating means 14 is configured to receive the response signal 26 by means of the antenna(s) 22a and/or 22b.

The calculating means is configured to control the feed signals 18a and 18b in a time-varying manner, like based on an algorithm stored in the calculating means 12. Alternatively or additionally, the calculating means 12 may also be configured to control the feed signals based on internal logic, maybe an adaptable algorithm, so that shaping the radiation pattern may take place during operation of the antenna device 10, irrespective of an external device. The algorithm may, for example, be stored in the calculating means 12 during manufacturing, servicing or calibration.

In accordance with option 1, the identification signal 16 may thus be obtained from an external radio identification reader at a terminal 26 of the calculating means 12 in order to provide the response signal 26 or a signal derived therefrom (conversion from wireless to wired, filtered, etc.) to the radio identification reader. This allows emitting a, perhaps single, identification signal having a plurality of radiation patterns 25a to 25b. When the external radio identification reader comprises a plurality of antenna terminals where the identification signal 16 or several identification signals are provided, a plurality of antenna devices 10 may be arranged at the plurality of antenna terminals in order to further increase a visual or reading range of the external radio identification reader.

The antennas 22a and 22b may comprise equal or mutually different radiation patterns 25a and/or 25b. Emitting the radio signal 24 with different radiation patterns 25a and/or 25b may, for example, take place by superimposing several radio signals which comprise mutually different phases and/or amplitudes. Alternatively or additionally, the antennas 22a and 22b may comprise a mutually different directional pattern (radiation pattern) and be driven separately. The calculating means 12 may be configured to provide a respective feed signal 18a and/or 18b to one or several antennas 22a and/22b each, so that a respective antenna generates the radio signal 24 with the radiation pattern 25a and/or 25b and so that the radio signal 24 may be emitted roughly in one sub-region associated with the radiation pattern 25a and 25b each. When the radiation patterns 25a and/or 25b or the sub-regions exhibit a beam shape, the antenna device 10 may be referred to as a multi-beam antenna.

The calculating means 12 is configured to control the feed signals 18a and 18b in a time-varying manner such that the radio signal 24 is emitted with one or several time-varying radiation patterns 25a and 25b. Exemplarily, the calculating means 12 may be configured to provide to the respective antenna 22a and 22b the feed signal 18a in a first time interval and the feed signal 18b in a second time interval different from the first time interval. The calculating means 12 may be configured to perform time-varying control in accordance with a predefined order stored in the calculating means 12. Alternatively or additionally, the calculating means 12 may be configured to control or adapt an order of the time-varying control of the radiation patterns 25a and 25b itself, like when the receive signal 26 is received and evaluated by the calculating means 12. This allows increasing the identification rate of transponder devices (so-called tags). Exemplarily, the radiation patterns 25a and 25b may overlap the space, wherein the transponder device comprises an increased sensitivity compared to one of the radiation patterns 25a and 25b and transmits a response signal 26 earlier, based on the radiation pattern 25a or 25b with the increased sensitivity. Adapting the radiation patterns 25a and 25b may take place irrespective of external devices (reading devices or interfaces to control the antenna device).

In addition, compared to a purely passive antenna, for example, the antenna device 10 may comprise a multi-beam functionality in a transparent manner for the external radio identification reader, since the functionality of varying the radiation pattern 25a-b is provided by means of the antenna device 10 and the (maybe unchanged) signal is still provided to the radio identification reader, that is that signal which it would also have provided to the passive antenna. This allows an easy extension of the functionality of an RFID reader and/or an RFID gate compared to antenna devices having unchanged radiation patterns or radiation patterns controlled from outside, so that an efficient functionality may be achieved, that is a quick functionality and/or one exhibiting a high identification rate.

Figure 2:
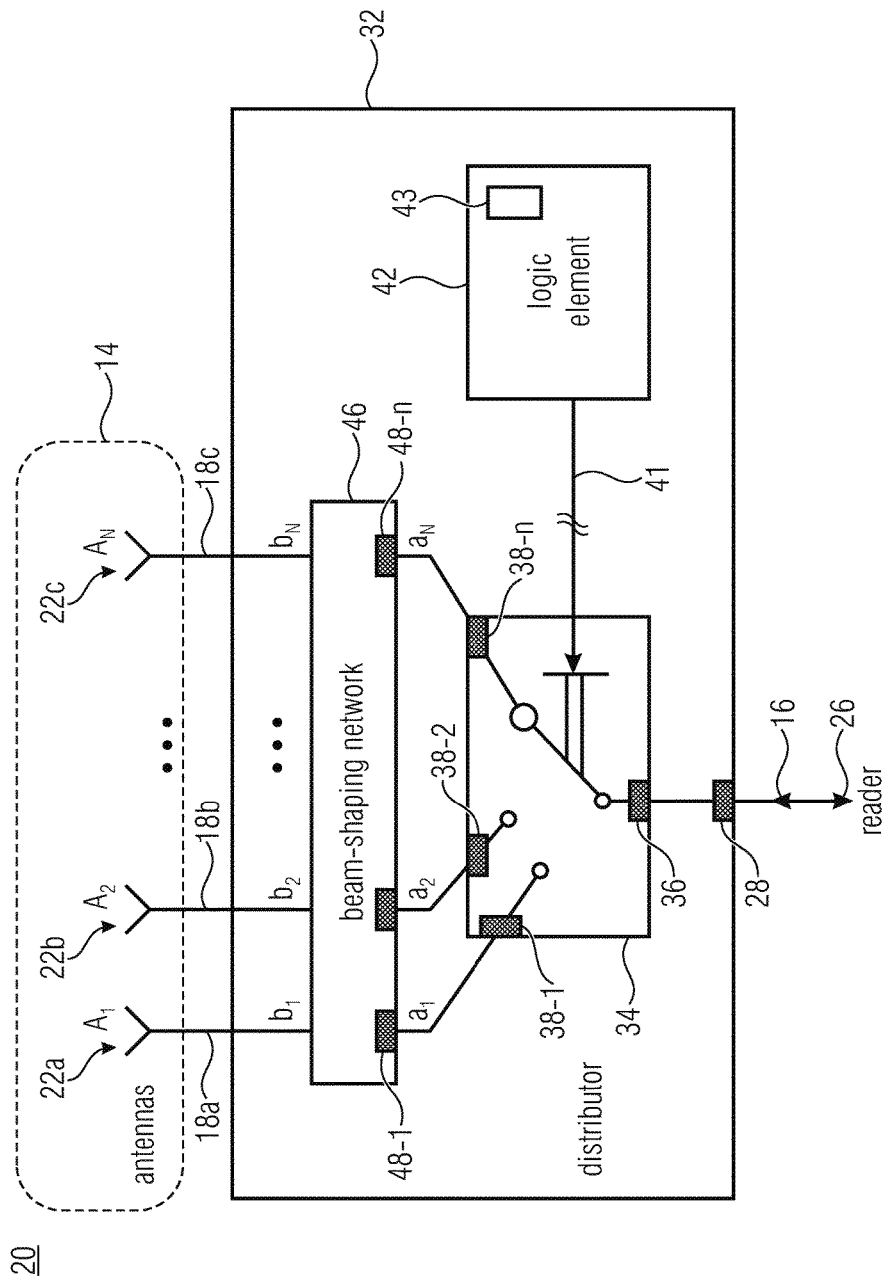
FIG. 2 is a schematic block circuit diagram of an antenna device comprising modified calculating means compared to the antenna device of FIG. 1, in accordance with an embodiment.

FIG. 2 shows a schematic block circuit diagram of an antenna device 20 which, compared to the antenna device 10, comprises modified calculating means 32. The calculating means 32 comprises the terminal 28 for wire-receiving or wirelessly receiving the identification signal 16 from an external radio identification reader and for transmitting the response signal 26 to the external radio identification reader.

The calculating means 32 comprises a controllable distributor 34 comprising a signal input 36 and a plurality of n signal outputs 38-1, 38-2, . . . 38-n. The controllable distributor 34 is configured to apply the identification signal 16 to one of the signal outputs 38-1 to 38-n based on the driving 41 obtained. The calculating means 32 comprises a logic element 42, such as an algorithm implemented in hardware, configured to control the controllable distributor 34 by means of the driving (control signal) 41 in a time-varying manner so that the controllable distributor 34 applies the identification signal to different signal outputs 38-1 to 38-n in a time-varying manner. Alternatively or additionally, the logic element 42 may comprise a storage 43 configured to store and execute the algorithm in the form of a code (software). This means that the algorithm may be implemented in either hardware or software.

In accordance with one implementation variation, the logic element 42 is configured to drive the controllable distributor 34 such that the same applies the identification signal 16 sequentially and successively to a signal output 38-1 to 38-n. Based thereon, a respective radiation pattern 25a or 25b of the radiating means 14 may be obtained, whereas a different radiation pattern 25b or 25 is not obtained.

The controllable distributor 34 is configured to output control signals $a_1, a_2, \ldots a_N$ at the signal outputs. The control signals $a_1$ to $a_N$ may be the identification signal 16, like when the controllable distributor 34 is implemented as a variable switch (splitter). Alternatively, the control signals $a_1$ to $a_N$ may be signals derived from the identification signal 16, wherein a derivation of the signals, may, for example, relate to a change in phase and/amplitude.

The calculating means 12 comprises a beam shaper 46, for example in the form of a wired network or one implemented as software, configured to receive the drive signals $a_1, \ldots a_N$ at the signal inputs 48-1, . . . 48-N and to provide the feed signals 18a-c referred to by $b_1, b_2, \ldots b_N$ for the antennas 22a-c referred to by $A_1, A_2, \ldots A_N$. The beam shaper 46 may, for example, be a Butler network or a Butler matrix. The beam shaper 46 may be adapted to the antennas 22a-c such that a signal input each or a combination of signal inputs is associated to a radiation pattern of the radio signal obtained.

Expressed in a simplified manner, the logic element 42 is implemented to control one or several signal outputs where the controllable distributor 34 outputs the control signal(s) $a_1$ to $a_N$, wherein a variable radiation pattern of the radio signal is obtained based on varying signal inputs 48-1 to 48-N where the control signals $a_1$ to $a_N$ are obtained from the beam shaper 46.

In other words, FIG. 2 shows a principle of an RFID multi-beam antenna for radio-frequency identification, that is for reading out passive RFID transponders, comprising only a single terminal for the reading unit. The multi-beam antenna (antenna device 20) consists of a number of antennas 22a-c connected to a feed network (beam shaper 46). Different feeds of the antenna may be realized using the feed network so that different directional patterns form. Which feed is used at a certain point in time may be determined autonomously by the multi-beam antenna (such as based on the algorithm) and does not have to be controlled by the reader. Changing between different feed here may take place in dependence on the respective scenario. Random, sequential, periodical changes or different patterns are possible here. The RFID multi-beam antenna here comprises a logic unit 42 which controls the change between the feeds.

Interaction with the transponders takes place in a manner transparent for the reader. The excitation signal (identification signal 16) is feed to the RFID multi-beam antenna by the reader. The same then radiates the signal using different directional patterns. The response signals which the single antennas make available are then superimposed in a constructive way, depending on the feed selected, and made available at the reading unit via the antenna terminal. Thus, spatial filtering may also be achieved using a reading unit comprising only a single antenna terminal.

The calculating means 12 contains a switch (controllable distributor 34) which places the signal from the reader at a single gate (signal input 48-1 to 48-n) of the beam-shaping network (beam shaper 46). A certain directional pattern of the radio signal corresponds with feeding a single gate. Switching between the different directional patterns may take place, thus switching is controlled by the logic element. Switching and, connected thereto, the directional patterns are effective both in case of transmitting and receiving. The antenna device 20 may thus be referred to as an RFID multi-beam antenna having autonomous switching between different directional patterns.

Alternatively or additionally, at least one of the antennas 22a-c, or $A_1$ to $A_N$, may be implemented as an antenna device 10 so that each of the feed signals 18a-c may be used as an identification signal of the antenna device 10 arranged. This allows a further increase in the visual and reading ranges (detection region) of the antenna device.

Figure 3A:
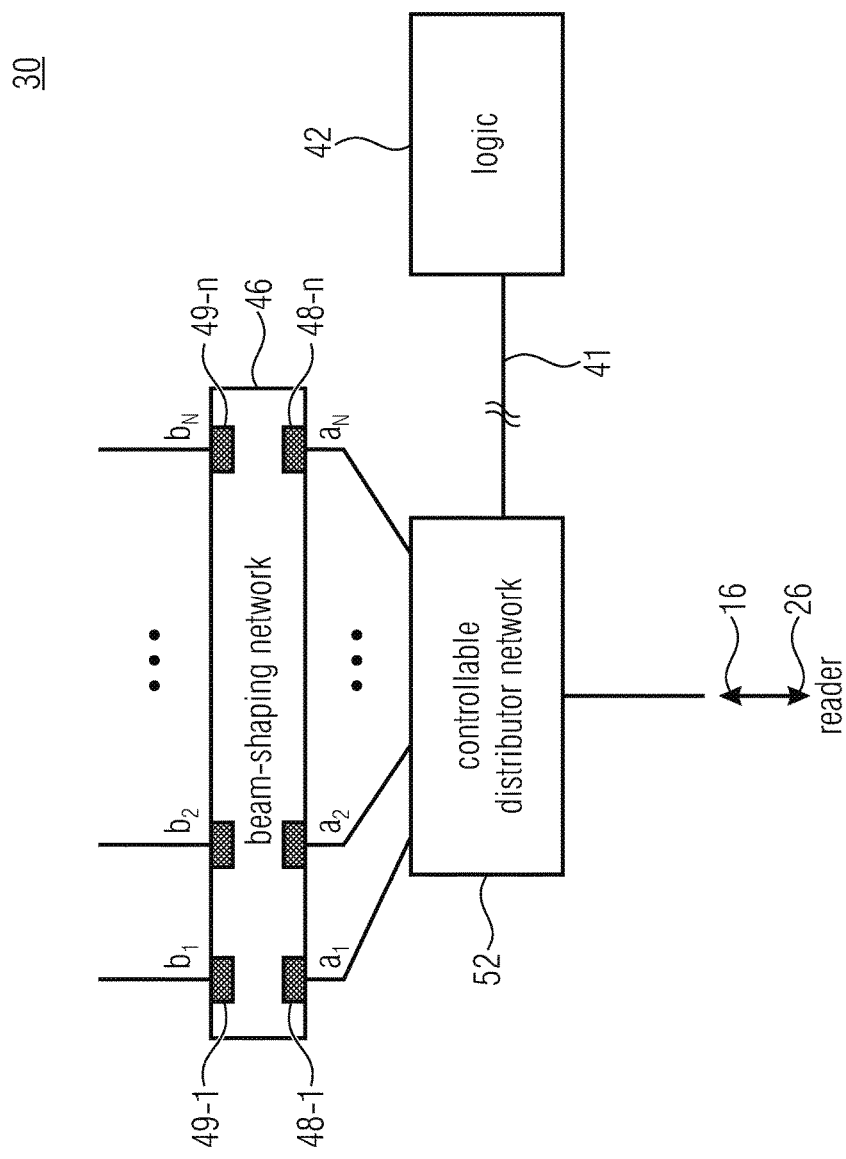
FIG. 3a is a schematic block circuit diagram of calculating means in which, compared to the calculating means of FIG. 2, a controllable distributor is implemented as a controllable distributor network, in accordance with an embodiment.

FIG. 3a shows a schematic block circuit diagram of calculating means 30 in which, in contrast to the calculating means 32 of the antenna device 20, a controllable distributor 52 is implemented as a controllable distributor network. The calculating means 30 may be arranged at or in the antenna device 10 or 20. As will be discussed, referring to FIG. 3b, in contrast to directly passing on the identification signal 16 from a signal input to a variable signal output, the controllable distributor network allows, simultaneously obtaining two or several control signals $a_1$ to $a_n$. The beam shaper 46 may be provided with an input signal at several signal inputs 48-1 to 48-N at the same time so that one or several feed signals $b_1$ to $b_N$ may be obtained at signal outputs 49-1 to 49-n of the beam shaper 46. This allows superimposing several directional patterns of the radio signal emitted. Expressed in a simplified manner, the controllable distributor 52, in contrast to the controllable distributor 34 implemented as a switch, is used in a parallelized manner, that is several output signals $a_1$ to $a_n$ may be obtained based on the identification signal 16.

In addition, the controllable distributor 52 or controllable distributor network allows adapting the respective output signals $a_1$ to $a_n$, as will be discussed below. As an alternative to the calculating means 32, the calculating means 30 may be arranged in the antenna device 20 or, as an alternative to the calculating means 12, be arranged in the antenna device 10.

In other words, FIG. 3a shows a section of a possible implementation of an RFID multi-beam antenna with autonomous switching between different directional patterns using a controllable distributor network.

Figure 3B:
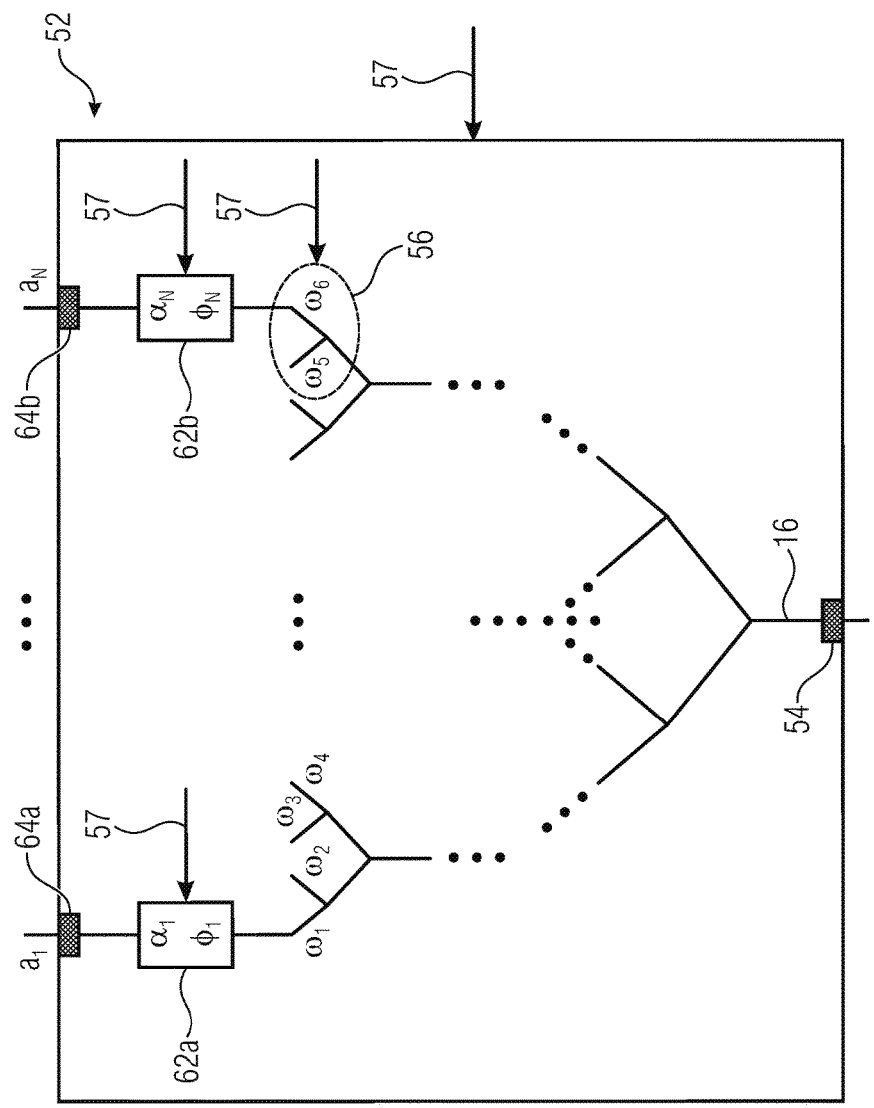
FIG. 3b is a schematic block circuit diagram of the controllable distributor of FIG. 3a, implemented as a controllable distributor network, in accordance with an embodiment.

FIG. 3b shows a schematic block circuit diagram of the controllable distributor 52 of FIG. 3a implemented as a controllable distributor network. The controllable distributor network 52 comprises a signal input 54 for receiving the identification signal 16. Furthermore, the controllable distributor network 52 comprises a plurality of branches (splitter) 55 which are each configured to branch off a signal received into two or, alternatively, more branch signals. The branch signals here may be controlled by weighting factors $w_1$ to $w_6$ so that distributing the respective signal received from a branch 55 into the branch signals obtained may take place symmetrically (at least two weighting factors of a splitter are equal) and/or asymmetrically (at least two weighting factors are unequal). The controllable distributor network 52 is configured to control the amplification or attenuation factors $\alpha_1 \ldots \alpha_N$ and/or phase values $\phi_1 \ldots \phi_N$ and, maybe, the weighting factors $w_1$ to $w_6$ based on the signal 57. The signal 57 may be the control signal 41.

In addition, the controllable distributor network 52 comprises signal matchers 62a and 62b connected between the branches 55 and signal outputs 64a and 64b of the controllable distributor network 52. The signal matchers 62a and 62b are configured to match a signal obtained from the branches 55. Matching may exemplarily relate to amplitude matching by means of an attenuation or amplification factor $\alpha_1$ to $\alpha_N$ and/or to phase matching by means of a phase shift $\phi_1$ to $\phi_N$. Further branches 55 may be arranged between the signal matchers 62a and 62b and the signal outputs 64a and 64b, respectively. Based on the identification 16, one or several drive signals $a_1$ to $a_N$ may be obtained based on the weighting factors $w_1$ to $w_6$ and the signal matchers 62a and 62b.

In other words, apart from switching to a single gate of the beam shaper, the signal of the reading unit may also be distributed to several gates of the beam-shaping network. The controllable distributor network (controllable distributor 52) which is controlled by the logic element, is used for this. The signal of the reading unit is transformed to the signals $a_1 \ldots a_N$. The specific signals $a_1 \ldots a_N$ may take a finite value, irrespective of one another, and/or be infinitesimal, perhaps even zero. The beam-shaping network generates the signals $b_1 \ldots b_N$ for feeding the antenna from the signals $a_1 \ldots a_N$. The controllable distribution and the directional patterns connected thereto are effective both in case of transmitting and receiving.

Figure 4:
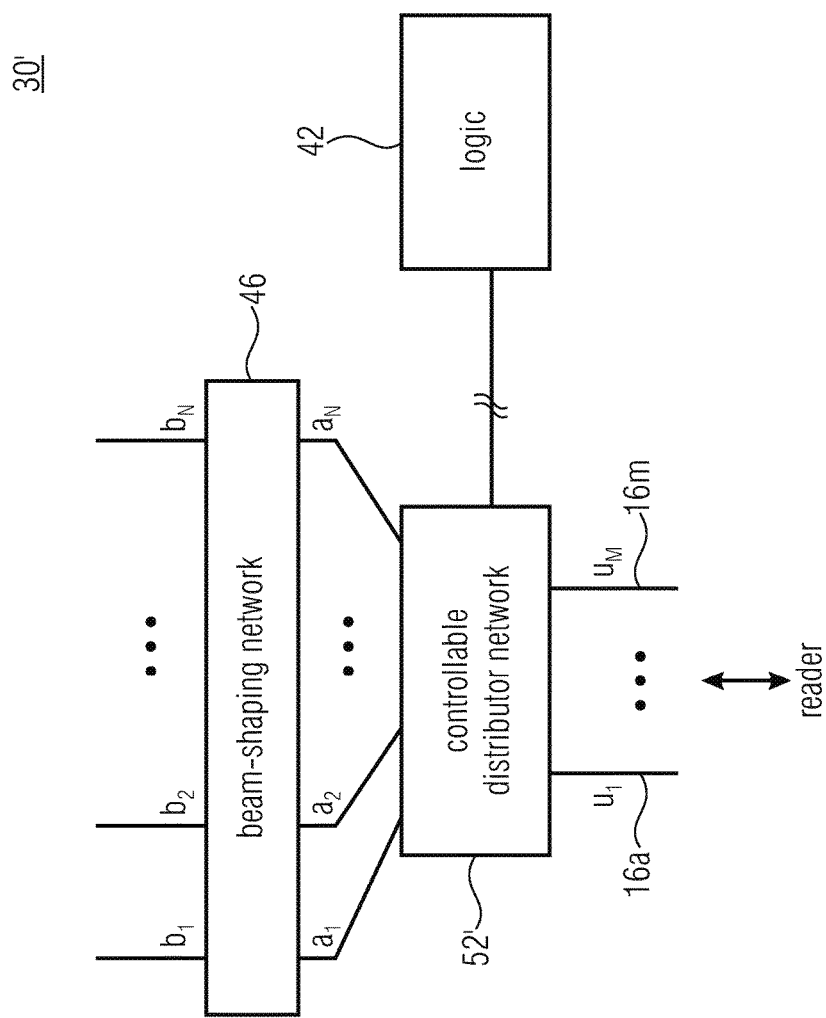
FIG. 4 is a schematic block circuit diagram of calculating means which, compared to the calculating means of FIG. 3a, comprises a modified controllable distributor network configured to receive a plurality of identification signals, in accordance with an embodiment.

FIG. 4 shows a schematic block circuit diagram of calculating means 30' which, in contrast to the calculating means 30, comprises a modified controllable distributor network 52' (controllable distributor). The controllable distributor network 52' is configured to receive a plurality of identification signals 16a to 16m, such as a number of m=2, 3, 4 or more. Receiving may take place simultaneously, that is several identification signals 16a to 16m may be received at a point in time or during a time interval. The controllable distributor network 52' is configured to generate the drive signals $a_1$ to $a_N$ based on the sequentially or parallel received identification signals 16a-m. The identification signals 16a-m may exemplarily be identification signals of a single external radio identification reader (RFID reader) which provides the same at a plurality of its antenna terminals. If the external radio identification reader is, for example, configured to be coupled to four antennas, it can provide four antenna signals (identification signals).

Alternatively, the identification signals 16a-m may also be received by different external radio identification readers, which means that the external radio identification readers may be coupled by means of the calculating means 30'.

In other words, the signal of the reader may be a single signal (FIG. 3a) or a quantity of signals $u_1 \ldots u_M$ or 16a-m (FIG. 4). The signals $u_1 \ldots u_M$ are transformed, via the controllable distributor network, to the signals $a_1 \ldots a_N$ by which the beam-shaping network is fed. This generates signals $b_1 \ldots b_N$ for exciting the antenna(s). This corresponds to a certain directional pattern. Using the logic element, different variations of the signals $a_1 \ldots a_N$ may be generated from the signal or signals $u_1 \ldots u_M$. This allows setting different directional patterns. The controllable distribution and the directional patterns connected thereto are effective both in case of transmitting and receiving.

The signals $u_1 \ldots u_M$ may be provided either by a single reading unit or by several different reading units. This means that reading units with a single signal terminal or with several signal terminals may be used and coupled to the calculating means. In addition, several reading units with a single signal terminal or with several signal terminals may be used. The reading units used may vary as regards their number of signal terminals. Thus, FIG. 4 shows a section of a possible implementation of an RFID multi-beam antenna with autonomous switching between different directional patterns using a controllable distributor network and, for the case of several signals from and to the reading unit or from and to several reading units.

Figure 5:
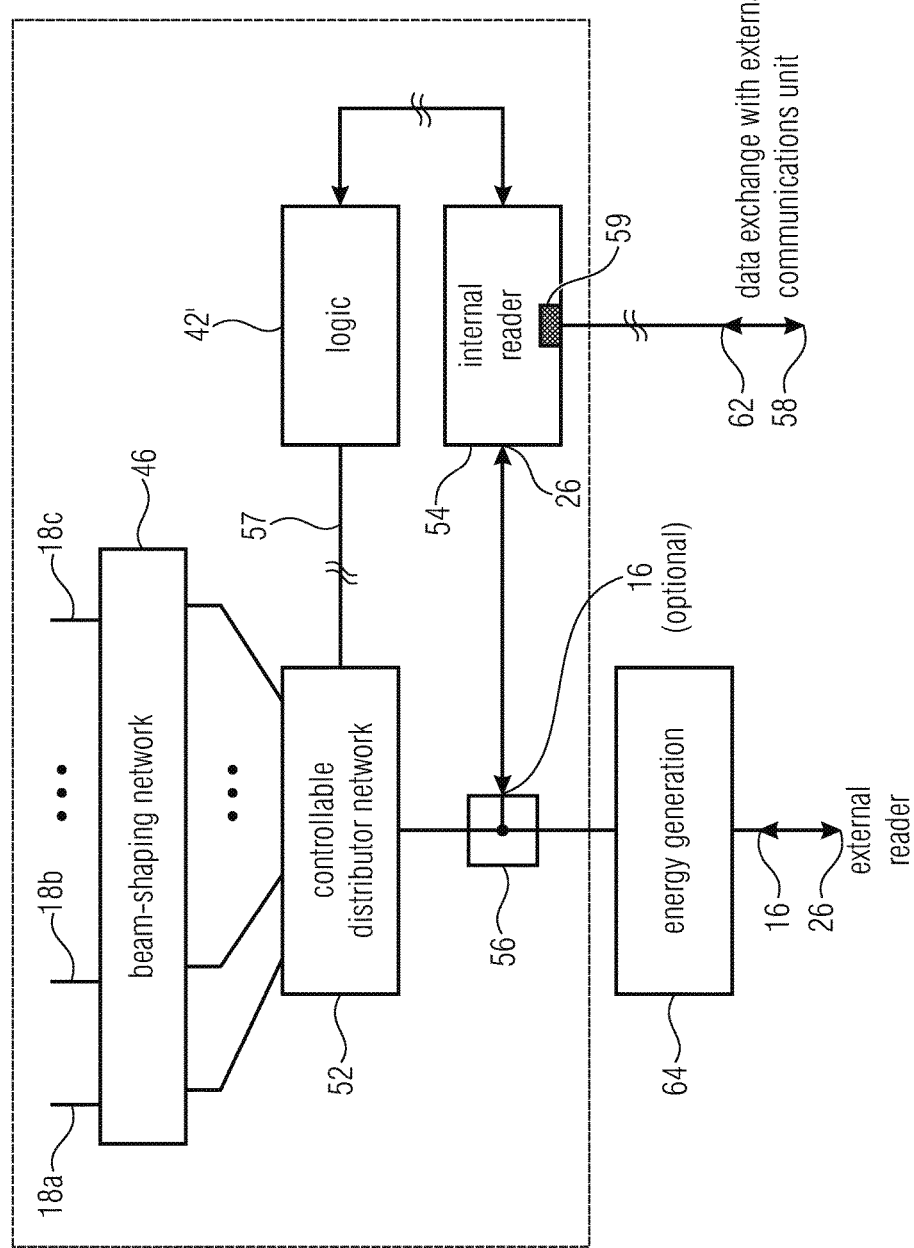
FIG. 5 is a schematic block circuit diagram of an antenna device comprising calculating means having an internal radio identification reader, in accordance with an embodiment.

FIG. 5 shows a schematic block circuit diagram of an antenna device 50 comprising calculating means 47. The calculating means 47, in contrast to the calculating means 30, comprises an internal radio identification reader 54 configured to evaluate the response signal 26. The internal radio identification reader 54 may, for example, be implemented as a processor (means), field-programmable gate array (FPGA) or the like. The calculating means 50 comprises a signal coupler 56 configured to receive the output signal 26 from the controllable distributor network 52 in order to couple out part of the response signal 26 and/or duplicate the output signal 26 such that the output signal 26 may be provided to the internal radio identification reader 54 and the external radio identification reader. In addition, the internal radio identification reader 54 is configured to control a logic element 42' in order to preset a radiation pattern of the radio signal, for example. In contrast to the logic element 42, the logic element 42' is modified such that it is controllable by means of the internal radio identification reader 54, that is the algorithm implemented is adaptable by the internal radio identification reader 54.

The internal radio identification reader 54 is configured to combine the response signal 26 received, or the information contained therein, like a transponder identification, with a radiation pattern using which the radio signal is transmitted or was transmitted at the time of transmitting the response signal 26. Combining the radiation pattern with the sub-region of the detection region thus allows obtaining position information relating to the presence of the transponder device which has transmitted the response signal, in the respective sub-region for the radiation pattern of which the radio signal is transmitted or has been transmitted. Expressed in a simplified manner, the calculating means 47 is configured to determine position information of the responding transponder device by means of associating the same to the sub-region and by means of the internal radio identification reader 54.

The internal radio identification reader 54 comprises a data interface 59 for exchanging a data signal 58 comprising the position information with an external communication unit. The data interface may be implemented to be wired or wireless. The external communication unit may, for example, be control and/or evaluating means configured to evaluate position information provided by the internal radio identification reader 54. Position information output by means of the data signal 58 may, for example, comprise a number of, one or several identifications (IDs) and/or movement information from transponder devices in the detection region or sub-region. In addition, the position information may include the transponder device passing from one sub-region to another sub-region.

In addition, the internal radio identification reader 54 is configured to receive a data signal 62 from the external communication unit by means of the data interface 59 or another data interface. The data signal 62 may, for example, be a control command (ON, OFF, information relating to an operating mode, changes relating to the algorithm of the logic element 42' to be executed, etc.). Thus, the data signal 62 may, for example, also comprise a search command relating to one or several transponder devices. When, for example, an identification or the like to be searched is transferred to the internal radio identification reader 54 by means of the data signal 62, when the response signal 26 comprises the identification or information of the transponder device searched, the reader 54 may output corresponding information by means of the data signal 58, like: "the transponder device searched has been recognized in sub-region x". In addition, the internal radio identification reader 54 may be configured to control the logic element 42' based on the data signal 62, like to switch from sequential switching between radiation patterns to a parallel implementation of radiation patterns, or the like.

In addition, the calculating means 50 comprises means 64 for generating energy or harvesting energy. The means 64 is configured to couple out part of the identification signal 16 and to provide electrical energy for operating the calculating means 50 or components thereof based on the part coupled out. This allows operating the calculating means 50 and thus, the respective antenna device in a manner self-sufficient in terms of energy. Thus, an antenna device may comprise the calculating means 47. This allows using the antenna device 50 as an add-on solution and/or replacement of other antennas of the external radio identification reader. The antenna device 50 consumes little or no external energy. Thus, external radio identification readers configured to radiate identification signals by means of passive antennas may be extended by the functionality of the antenna device 50 without requiring an additional external energy supply for the antenna device 50.

Alternatively or additionally, the means 64 for generating energy may also be arranged in the antenna devices 10 and/or 20.

Alternatively, the antenna device 50 may also be implemented such that the calculating means 47 or the internal radio identification reader 54 provides the identification signal 16 internally. This means that the antenna device 50 may also be implemented as a (self-sufficient) radio identification reader and that receiving the identification signal 16 from the external radio identification reader and/or passing on the response signal 26 to same may be omitted. Such a self-sufficient radio identification reader may also be implemented with no means 64 for generating energy and may obtain energy for operating the antenna device 50 and/or the calculating means 47 from a different energy source, like a power supply network. Alternatively, the internal radio identification reader may also be configured to obtain several identification signals from one or several external reading devices and/or to generate several identification signals internally.

In other words, the RFID multi-beam antenna may, as an additional element, contain an RFID reading module which allows identifying transponders. Based on the identification, conclusions may thus be drawn as to the position of the transponder. Part of the signal from and to the reader is provided to an integrated reader (internal radio identification reader 54). This allows identifying the transponders read. The integrated reader is in connection with the logic element which controls a controllable distributor network and, consequently, the distribution of the reader's signal. The logic element and the integrated reader may be considered to be a unit. The unit may associate a certain directional pattern to each transponder identified. This information may be provided to an external control unit via an interface. The interface may be wired (like a serial interface, a network interface or the like) or wireless (like a WLAN interface, a Bluetooth interface, a mobile radio interface or the like). The implementation of the calculating means 47 may be combined with the implementations of the calculating means in FIGS. 1, 2, 3a and 4. Thus, FIG. 5 shows a section of a potential implementation of an RFID multi-beam antenna with autonomous switching between different directional patterns with an integrated reading element ("integrated reader") and a data interface for exchanging data with an external control unit.

An exemplary scenario for illustrating obtaining position information will be discussed below referring to FIGS. 6a-6e.

Radiation patterns 25a-e of the antenna device 50 are shaped like beams. The sub-regions correspond to an area or a volume of the respective beam.

The antenna device 50 (multi-beam antenna MLA) exemplarily comprises five radiation patterns 25a-e which are each associated to a sub-region of the detection region of the antenna device 50 formed by the total of radiation patterns 25a-e. Alternatively, the antenna device 50 may also comprise more or less than five radiation patterns which are associated to a number of more or less than five sub-regions. The antenna device 50 may, for example, detect two (like left/right, top/bottom or the like) sub-regions or a higher number of sub-regions which may be arranged in space to be overlapping or non-overlapping. At least one of the radiation patterns 25a-e is associated to each sub-region.

Figure 6A:
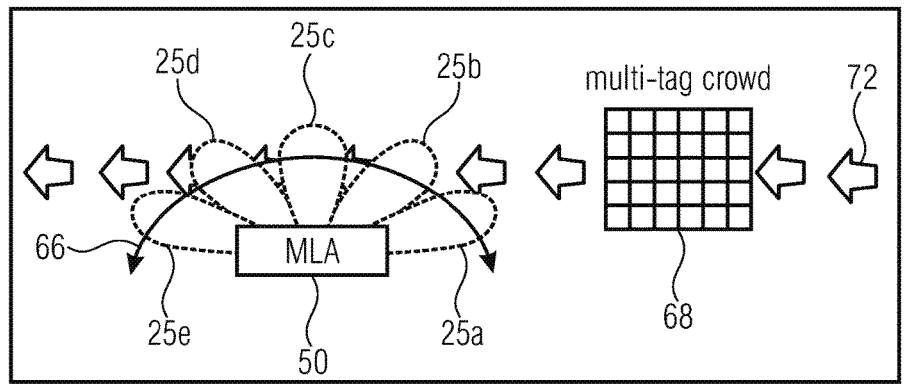
FIG. 6a shows a situation of a scenario in which the antenna device of FIG. 5 is configured to emit the radio signal sequentially and successively in sub-regions until a transponder device has been detected, in accordance with an embodiment.

FIG. 6a shows a situation (first time interval) of the scenario in which the antenna device 50 is configured to emit the radio signal in the sub-regions or by means of the radiation patterns 25a-e sequentially one after the other until a transponder device has been detected. Alternatively, the antenna device 50 may also be configured to emit the radio signal with at least two radiation patterns at the same time, that is in parallel. Simultaneous emission here may relate to a change between emitting with different radiation patterns performed at a high switching rate, or to a plurality of radiation patterns obtained continuously over an interval and at the same time. Rotatingly polling for transponder devices in the sub-regions may be achieved by means of sequentially emitting the radio signal with the radiation patterns 25a-e in accordance with the to-and-fro principle, as is indicated by the arrow 66. This may also be referred to as rotating beam polling for tag identification.

A collection 68 of transponder devices, like a pallet having a plurality or multitude of objects, provided with transponders, is arranged outside the detection region of the antenna device 50 and moves towards the detection region of the antenna device 50 by means of moving along a direction of movement 72.

Figure 6B:
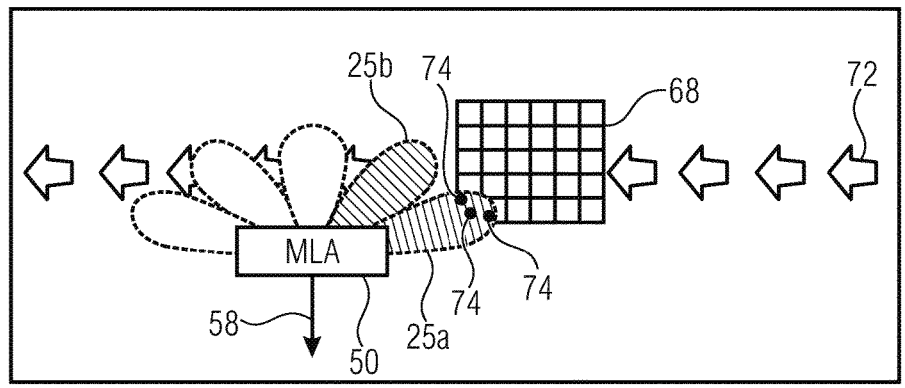
FIG. 6b shows a situation of the scenario in which a collection of transponder devices has reached the detection region of the antenna device, in accordance with an embodiment.

FIG. 6b shows a situation (second time interval) of the scenario in which the collection 68 has reached the detection region of the antenna device 50 and the antenna device 50 identifies transponder devices 74 in the sub-region associated with the radiation patterns 25a. In addition, the antenna device 50 may be configured to output corresponding information by means of the data signal 58. The antenna device 50 may be configured to emit the radio signal with the radiation pattern 25a based on identifying the transponder devices 74 at an increased repetition rate and/or duration compared to the situation in FIG. 6a. The increased repetition rate or duration may result in a time slice of at least 50%, at least 70%, at least 95% or even 100% in which the radio signal is emitted in the respective sub-region.

Alternatively or additionally, the antenna device 50 may be configured to emit the radio signal with the radiation pattern 25b with an increased repetition rate or duration as well, since it may be expected for the collection 68 and/or the transponder devices 74 to move on, for example. The radio signal with the radiation pattern 25a in FIG. 6a may, for example, be emitted at a first repetition rate of, for example, 1/sec, 2/sec or any other value. Alternatively or additionally, the radio signal with the radiation patterns 25a-e may be emitted each for a duration of 0.1 sec, 0.2 sec, or 0.3 sec (overlapping time domains). The radio signal with the radiation pattern 25a in FIG. 6b may, for example, be transmitted at a repetition rate of 10/sec, 15/sec or another value increased compared to the situation in FIG. 6a. Alternatively or additionally, the radio signal with the radiation pattern 25a may also be transmitted permanently. The antenna device 50 is configured to emit the radio signal with the radiation pattern 25b at an increased repetition rate and/or duration compared to the situation in FIG. 6a. The sub-region associated to the radiation pattern 25a is, for example, located in an outer region of the detection region. In the sub-region abutting thereon and associated to the radiation pattern 25b, an arrival of transponder devices may be expected subsequently. The repetition rate or duration at which the radio signal with the radiation pattern 25b is emitted may be equal or smaller compared to the repetition rate or duration at which the radio signal with the radiation pattern 25a is emitted.

Figure 6C:
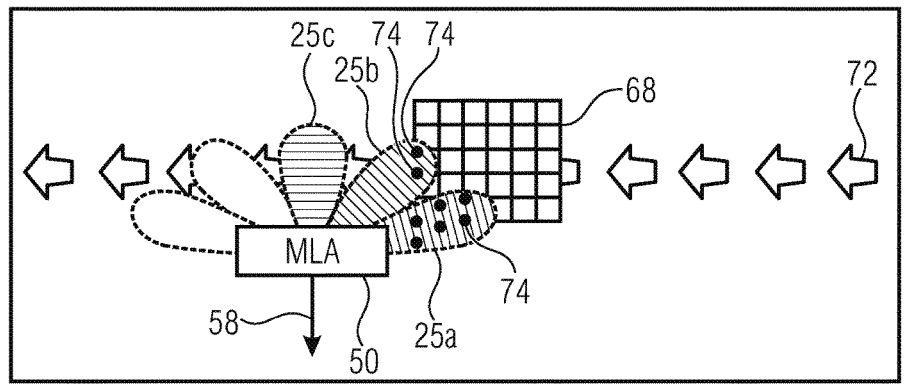
FIG. 6c shows a situation of the scenario in which the collection of the transponder devices has moved along a direction of movement compared to the situations of FIGS. 6a and 6b, in accordance with an embodiment.

FIG. 6c shows a situation in which the collection 68 of the transponder devices has moved further along the direction of movement 72 compared to the situations of FIGS. 6a and 6b so that transponder devices 74 respond in the respective sub-region based on emitting the radio signal with the radiation pattern 25a and 25b. A number of transponder devices responding to emitting the radio signal with the radiation pattern 25a may also be increased based on the collection 68 moving. The antenna device 50 is configured to output corresponding information by means of the data signal 58. In addition, the antenna device 50 is configured to emit the radio signal with the radiation pattern 25c where transponder devices 74 are expected to be in the future based on the movement, at an increased, maybe second repetition rate or increased duration.

Figure 6D:
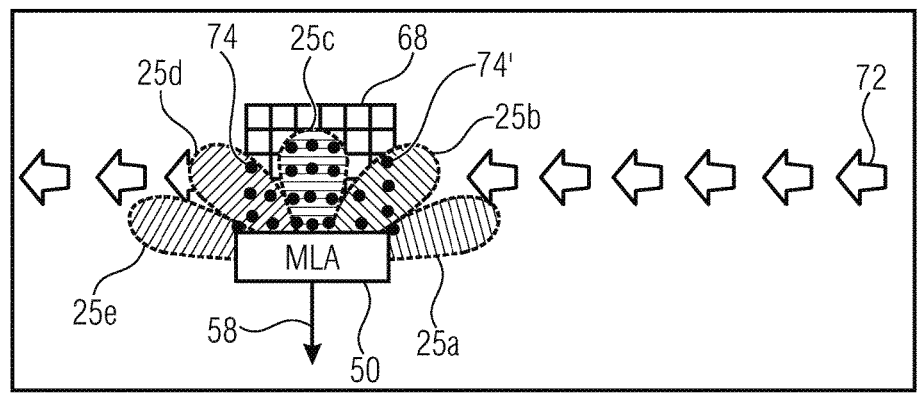
FIG. 6d shows a situation in which, based on emitting the radio signal, with each of the radiation patterns, transponder devices transmit response signals in all sub-regions, in accordance with an embodiment.

FIG. 6d shows a situation in which transponder devices 74 transmit a response signal based on emitting the radio signal with each of the radiation patterns 25a-e. This means that transponder devices 74 are detected in each sub-region of the detection region of the antenna device 50. The antenna device 50 is configured to emit the radio signal with the radiation patterns 25a-e each with a repetition rate or duration increased compared to the situation in FIG. 6a. In addition, the antenna device 50 is configured to output, by means of the data signal 58, the fact that a "searched" transponder device 74' has been detected in the sub-region associated to the radiation pattern 25b, or that the position of the transponder device 74' in the sub-region has been determined. Alternatively or additionally, the antenna device 50 may be configured to output, by means of the data signal 58, the fact in which sub-region which number of transponder devices 74 has been detected, that is the position of which has been determined to be in the sub-region.

Figure 6E:
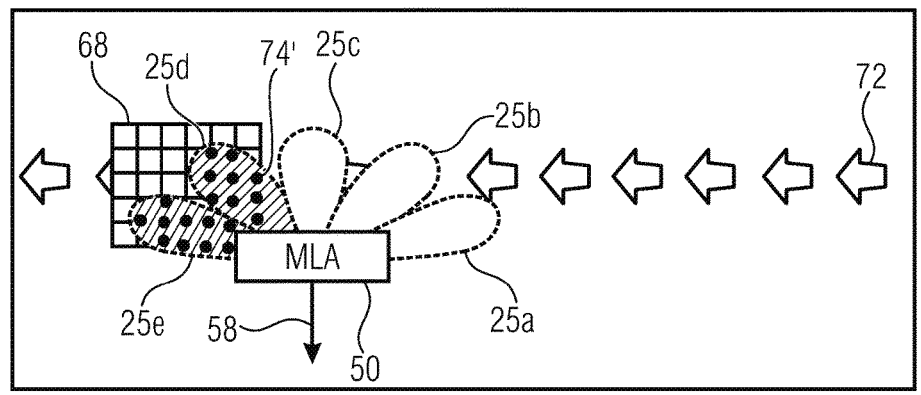
FIG. 6e shows a situation in which the collection has left, at least partly, the detection region of the antenna device, in accordance with an embodiment.

FIG. 6e shows a situation in which the collection 68 has left at least partly the detection region of the antenna device 50 based on the movement. Emitting the radio signal with the radiation patterns 25a, 25b and 25c is responded to with a response signal by none of the transponder devices. The antenna device 50 may be implemented to emit the radio signal with the corresponding radiation patterns 25a-c at a decreased, like the first, repetition rate or duration. Alternatively or additionally, the antenna device 50 may also be configured to disable the radiation patterns 25a-c or the sub-region (beam), that is not to emit the radio signal with the radiation patterns 25a-c. The transponder device 74' transmits a corresponding response signal to emitting the radio signal with the radiation pattern 25b. The antenna device 50 is configured to output, by means of the data signal 58, movement information comprising information on the fact that the "visited" transponder device 74' has moved from the sub-region associated to the radiation pattern 25b to the sub-region associated to the radiation pattern 25d. Alternatively or additionally, the antenna device 50 may be configured to output the movement or position information relating to other transponder devices as well, maybe even without having transferred a search order to the antenna device 50.

Expressed in a simplified manner, a sub-region of the detection region of the antenna device 50 is associated to each radiation pattern 25a-e. When the antenna device 50 detects one or several transponder devices 74 in a sub-region, the antenna device 50 is configured to poll neighboring sub-regions and that sub-region in which the transponder device(s) 40 have/has been detected, at an increased intensity, like at a portion of at least 50%, at least 70% or 100% of a duration (like 1 second, 2 seconds or 5 seconds). Continuous beam switching and polling until one of the beams (sub-regions or radiation patterns) has identified a transponder, takes place in FIG. 6a. FIGS. 6b-6d show an increased or permanent activation of the beams where transponders are identified (permanently active beams) or are expected (occasional or permanent polling of the subsequent beam), and only occasional polling in the remaining sub-regions (permanently or occasionally inactive beams). FIG. 6e shows successively switching off the beams until a last beam (radiation pattern 25e) in the row does no longer identify a tag.

In other words, FIGS. 6a-6e show a basic example of autonomous beam or beam switching in accordance with a true flow direction (direction of movement 72). The exemplary scenario shows the case of a pallet having a quantity of transponders passing by and possibly connecting or switching feeds or correctional patterns (radiation patterns). At first, the directional patterns are switched to one after the other until one or several transponders are identified with an active pattern to the right (radiation pattern 25a). With increasing approximation between the pallet (collection 68) and the antenna, transponders are identified via further characteristics or patterns. When the pallet has passed the RFID multi-beam antenna, no more transponders are read via the directional patterns directed to the right. The term "right" here refers to a viewing direction of FIGS. 6a-6e and is to be understood to be only exemplary and with no restricting effect as regards the arrangement of the transponders relative to the antenna device 50.

Figure 7:
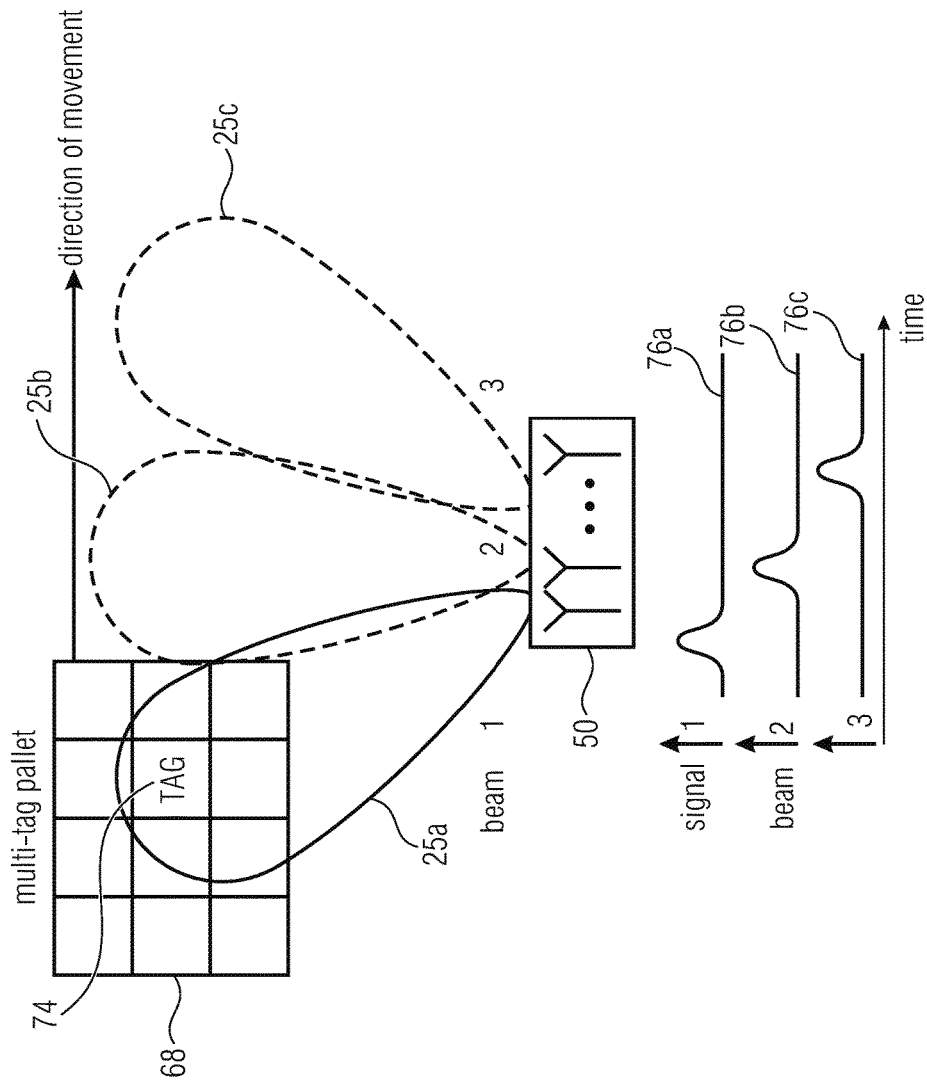
FIG. 7 shows another exemplary scenario in which the antenna device of FIG. 5 is configured to emit the radio signal with three radiation patterns which are associated to three mutually overlapping sub-regions, in accordance with an embodiment.

FIG. 7 shows another exemplary scenario in which the antenna device 50 is configured to emit the radio signal with three radiation patterns 25a-c which are associated to three mutually overlapping sub-regions and indicated as "beam 1, 2 and 3". In addition, FIG. 7 shows a schematic progress of three signals 76a-c associated to detecting transponder devices in the sub-regions of the respective beam, that is sub-region. When the transponder device 74 and/or other transponder devices transmit(s) a response signal to the radio signal transmitted with the radiation pattern 25a, the signal 76a is obtained, for example by means of the internal radio identification reader of the antenna device 50. An increased signal amplitude of the signals 76a-c hints at obtaining one or several response signals. At a later point in time, an increased signal amplitude is obtained in the signal 76b and relative to another sub-region. At an again later point in time or interval, an increased signal amplitude is obtained in the signal 76c, which hints at the presence of the transponder device(s) 74 in the sub-region associated to the radiation pattern 25b and/or 25c. A direction of movement of the transponder devices or the transponder device 74 in the detection region across the sub-regions of the antenna device 50 may be determined by means of comparing the signals 76a-c. The signals 76a-c may be provided by means of the data signal 58 of FIG. 5 or 6 from the antenna device 50. Alternatively, the direction of movement determined or other information derived from the signals 76a-c, like a speed, may be provided.

In other words, FIG. 7 shows a schematic connection between the movement of a pallet having several transponders and the signal in accordance with identifying the transponder, associated to the different directional patterns. By associating transponders to specific directional patterns, the direction of movement of the pallet can be deduced, that is deciding whether the pallet moves along a direction (for example from the right to the left or from the left to the right or along a different direction). This information may be guided to the outside for further processing via an interface. This allows influencing, optimizing or further automating logistic processes. It may, for example, be determined automatically in case of a gate passage whether the pallet leaves or enters a certain region. By associating transponders to certain directional patterns, recording a trajectory is also possible. By resolving the direction of the transponder signals and switching between different directional patterns (beams) 1, 2 and 3 which are formed in different directions, what results are time-offset signals for specific directional patterns. This allows estimating the speed of a passing pallet having transponders, upon which automated flow control may, for example, be based. Furthermore, localizing transponders is possible. This may, for example, serve for self-localization of floor conveyors or the like which are equipped with a reading unit and a multi-beam antenna and are able to navigate automatically using fixedly installed transponders, for example within a warehouse.

Figure 8:
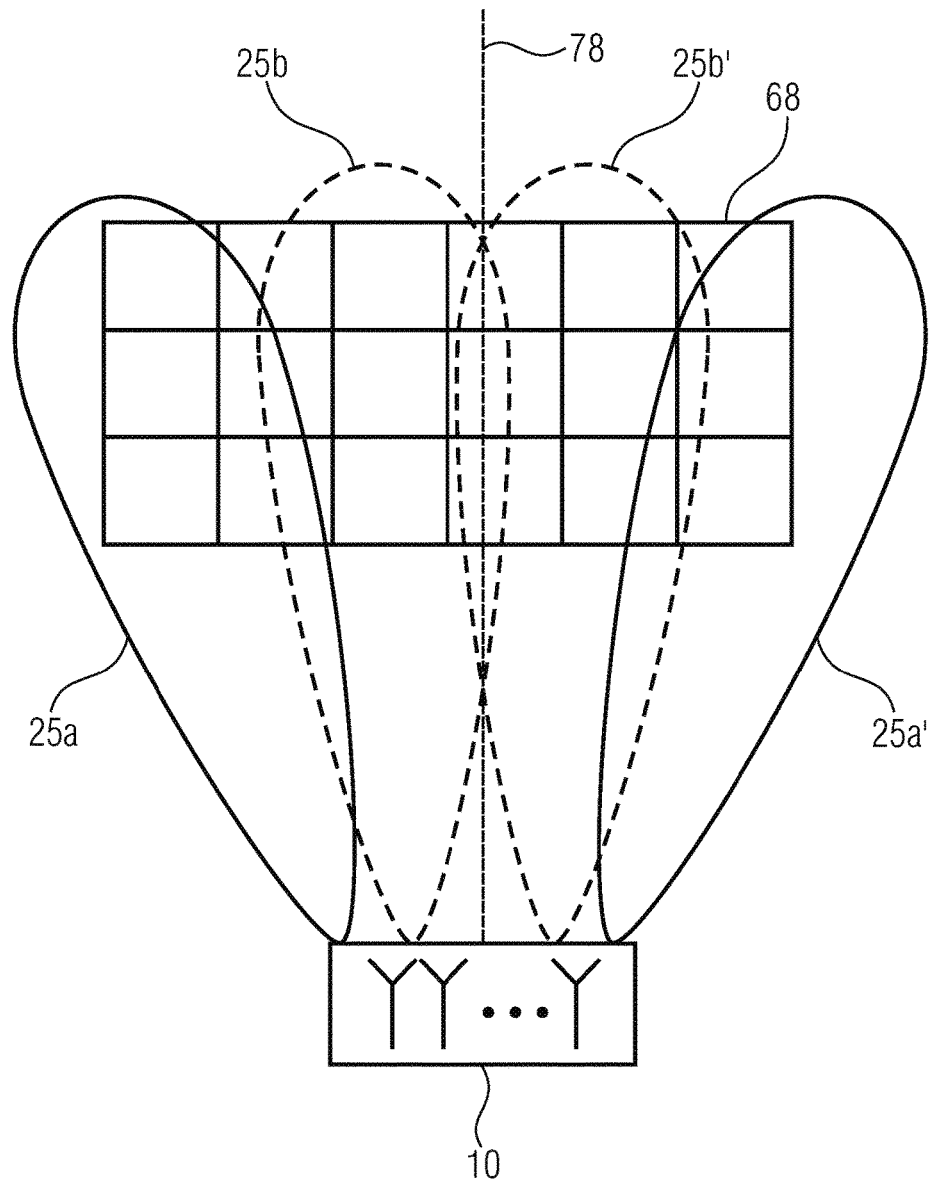
FIG. 8 is a schematic illustration of switching between directional patterns in accordance with an embodiment.

FIG. 8 shows a schematic illustration of switching between directional patterns 25a, 25a', 25b and 26b', as may be implemented by the antenna device 10, 20 and/or logic 42 or 42'. The collection 68 comprises a maybe high number of transponder devices, for example a number of at least 100, at least 500 or at least 1000. Simultaneously emitting the radio signal to all the transponder devices of the collection 68 may result in an increased number of collisions of response signals, which in turn results in an increased duration until having identified all the transponder devices. Emitting the radio signal with different directional patterns 25a, 25a', 25b and 25b', or in different sub-regions associated to the radiation patterns, may result in an increased detection speed. The radio signal is at first emitted in a sub-region, for example, so that only a part of the collection 68 of the transponder devices transmits a corresponding response signal. Subsequently, detection may take place in another sub-region. When a radio protocol used comprises a so-called sedating function, that is when only one response signal is transmitted, like in a corresponding slotted Aloha protocol, even when the sub-regions overlap it may be achieved that a transponder device transmits only one response signal and that a number of signal collisions is reduced further. Such a protocol, or a protocol implemented in a different manner, may be implemented by the respective logic or be stored in the logic's memory and, maybe, amended by an internal radio identification reader.

At first, that sub-region associated to the radiation pattern 25*a* may, for example, be polled and subsequently that sub-region associated to the radiation pattern 25*a'*. That sub-region associated to the radiation pattern 25*b* may then be polled, for example, and subsequently that sub-region associated to the radiation pattern 25*b'*. Such polling "from the outside to the inside" allows for a high or maximum number of transponder devices to be identified even when moving the collection 68, before these leave the detection region of the antenna device 10 again.

Alternatively, the antenna device 10, or logic implemented or executed correspondingly, may also provide for a different order of radiation patterns and/or sub-regions. Several sub-regions may also be polled at the same time.

In other words, FIG. 8 shows a possible scenario of switching between different directional patterns from the outside to the inside. Switching between directional patterns may be tailored to the respective scenario. With pallets with a very large number of objects and/or transponders, the response signal from covered transponders may be superimposed by the response signal of the other transponders, thereby causing delayed detection. With such scenarios, the way of making use of different directional patterns allows to at first excite, read out and then sedate the outermost transponders. This may, for example, take place by means of at first emitting the radio signal with the radiation patterns (beams) 25*a* and 25*a'*. After that, the patterns (beams) 25*b* and 25*b'* at the second outmost position are switched to in order to be able to read out the next section. This allows successively detecting the transponders on a pallet and, thus, reducing the number of collisions and, consequently, the detection duration.

Alternatively, the antenna device 10 may also be configured to implement a higher number of directional patterns. The directional patterns may be symmetrical relative to a center line 78 of the detection region so that the detection "from the outside to the inside", as is illustrated, may take place to be symmetrical relative to the center line 78 and/or comprising a higher number of sub-regions.

Figure 9:
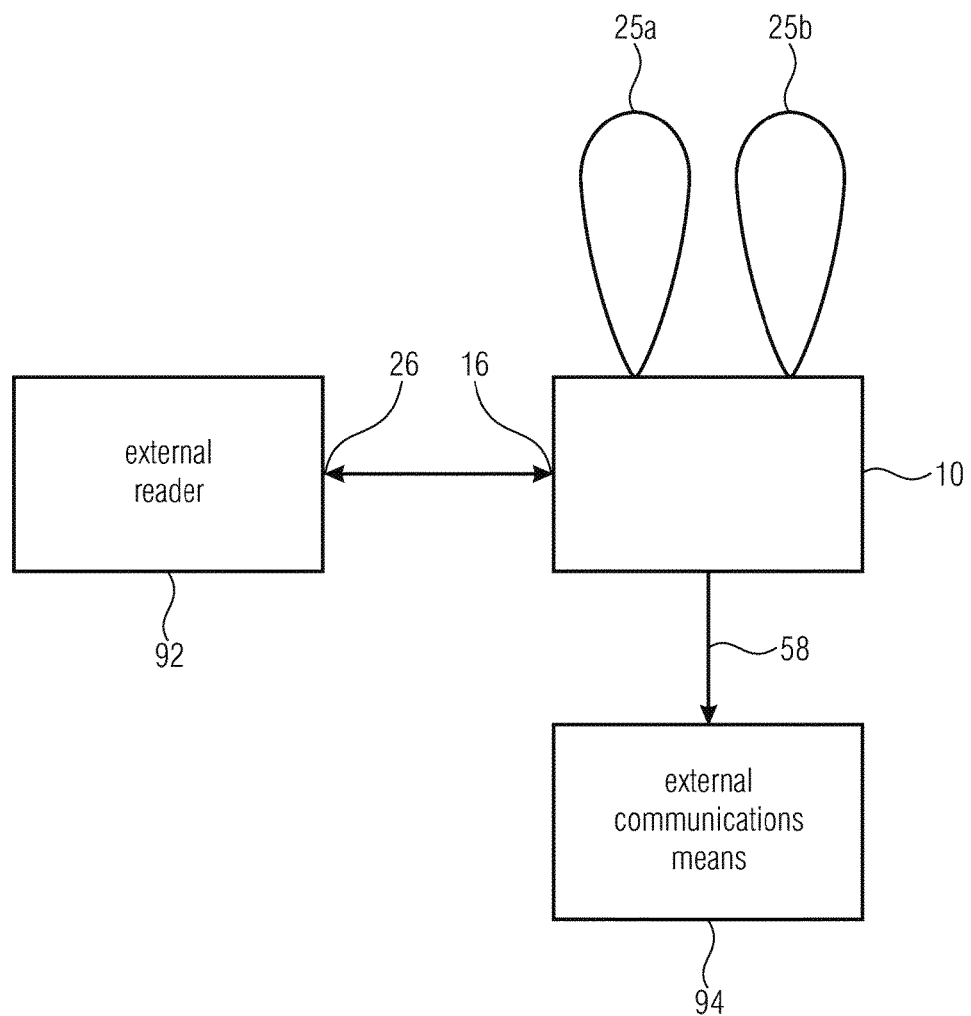
FIG. 9 is a schematic block circuit diagram of a radio identification system comprising the antenna device of FIG. 1, an external radio identification reader and external communication means, in accordance with an embodiment.

FIG. 9 shows a schematic block circuit diagram of a radio identification system 90 comprising the antenna device 10, an external radio identification reader 92 and the external communication means 94. The external radio identification reader 92 is configured to provide the identification signal 16 and to receive and evaluate the response signal 26.

The external communication means 94 may be coupled to the antenna device 10 permanently or occasionally in order to determine the corresponding order of variation of the radiation patterns 25*a* and 25*b* and/or store same in the antenna device 10. Alternatively, the antenna device 20 and/or an antenna device comprising the calculating means 30, 30' or the antenna device 50 may also be provided instead of the antenna device 10.

When the corresponding processing and/or order of the radiation patterns 25*a* and 25*b* is stored permanently in the antenna device, the radio identification system 90 may also not comprise the external communication means 94.

Figure 10:
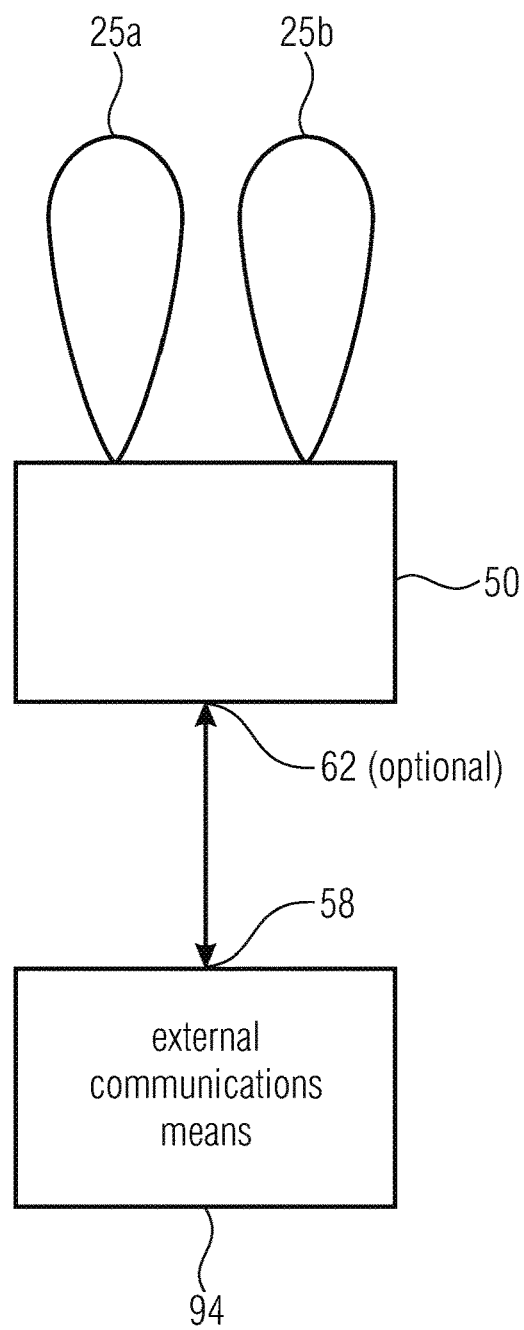
FIG. 10 is a schematic block circuit diagram of a radio identification system comprising the antenna device of FIG. 5 and the external communication means, in accordance with an embodiment.
Figure 11A:
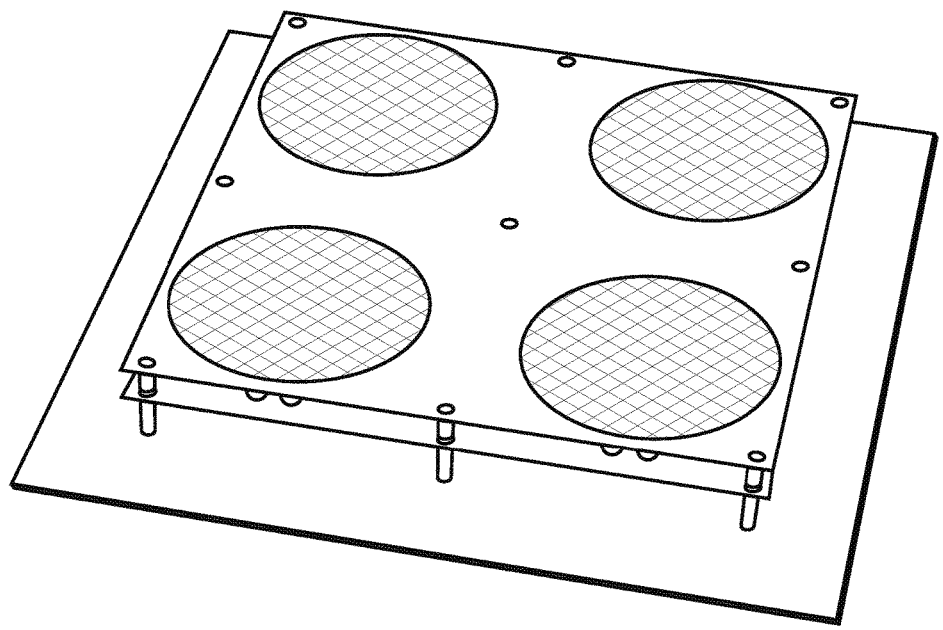
FIG. 11a shows an exemplary total set up of a multi-beam antenna in accordance with the known technology.
Figure 11B:
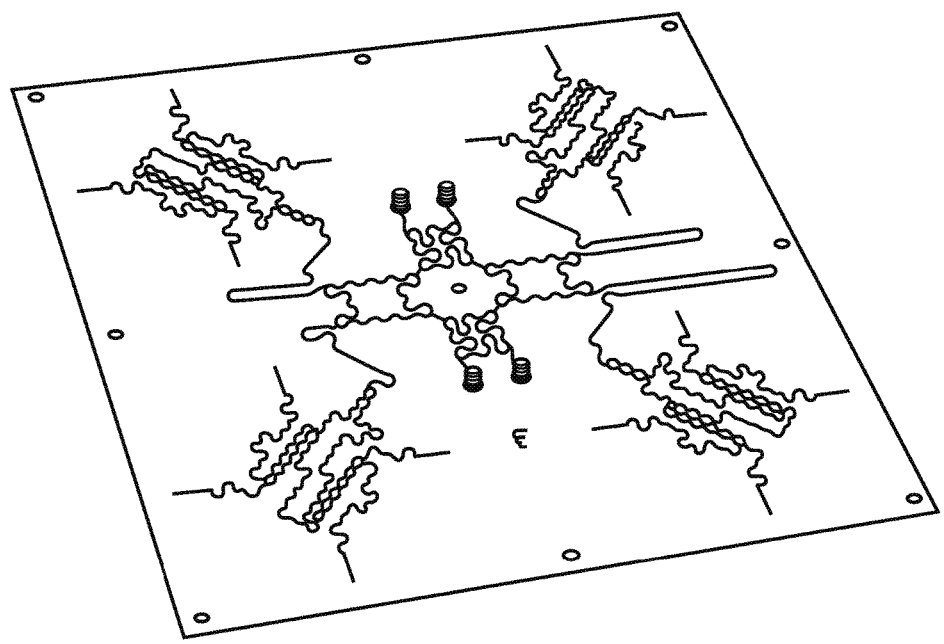
FIG. 11b shows a realization of a feed network having a Butler matrix in accordance with the known technology.

FIG. 10 shows a schematic block circuit diagram of a radio identification system 100 comprising the antenna device 50 and the external communication means 94. As is described in FIG. 5, the antenna device 50 is configured to generate the identification signal by means of the internal radio identification reader and consequently implements the functionality of the external radio identification reader. The external communication means 94 is configured to obtain the position information obtained from the antenna device 50 by means of the data signal 58. The external communication means 94 may be configured to optionally provide the data signal 62 to the antenna device 50, like in order to transfer to the antenna device 50 or influence an operating state and/or one or several transponders to be determined.

A number of advantages may be achieved by embodiments as described above. An antenna device (RFID multi-beam antenna) may, for example, be used with a reading unit having only a single antenna terminal. A transparent interaction with the transponders may take place for the external reading unit(s), which means that the external reading units can be equipped with antenna devices in accordance with embodiments as described above with no further modification. Switching between the radiation patterns (directional patterns) may be adapted to different situations. The change may, for example, take place arbitrarily, sequentially, from the outside to the inside or in any other order.

The antennas of the radiating means do not require a distributed arrangement for emitting the radio signal in different sub-regions, but may be arranged locally or compactly. This allows realizing a compact reading unit with a reader and RFID multi-beam antenna. An external radio identification reader having several antenna terminals may be connected to several RFID multi-beam antennas in accordance with above embodiments. A single radio identification reader may consequently act in greater a spatial region. A two- or three-dimensional illumination of the detection region may take place by different orientations of the RFID multi-beam antennas, using a single reading unit (radio identification reader).

Further advantages result from identifying the transponders within the RFID multi-beam antenna and providing the information relating to associating transponders and the directional pattern via an interface. Among these are that the direction of movement and the estimated relative speed can be determined in moving objects having transponders. When transponders pass gates, it may be determined automatically whether objects leave or enter a region. This allows automated registering or checking out of objects in electronic administration, production environments or the like. With security-relevant applications, it may also be recognized when an object unintentionally leaves or enters a certain area. Flow control may be regulated automatically or adapted to the estimated relative speed within displacing units. Furthermore, transponders can be localized, that is associated to a sub-region. Objects having transponders may thus be found or the position thereof be recorded for further logistics processes in electronic administration. Floor conveyors are able to navigate autonomously when equipped with a reading unit comprising a reader and RFID multi-beam antenna and transponders (for position identification) are installed fixedly in the range of movement. In addition, an interface for transferring the information may be implemented to be both wired and wireless. With a wired interface, the RFID multi-beam antenna may be integrated in an existing wired bus system or in a wired network and thus communicate with a control unit. The control unit (external communication means) here may be spatially separate from the RFID multi-beam antenna, like at a different location, wherein communication may take place via an Internet connection. With a wireless interface, the RFID multi-beam antenna may be integrated in an existing wireless network and thus communicate with a control unit or communicate with the control unit via an ad-hoc interface (like Bluetooth). The control unit here may be spatially separate from the RFID multi-beam antenna, like positioned at a different location, wherein communication may take place using mobile radio communication.

Fields of application of embodiments described above are, for example, the field of logistics and, in this field, managing objects within warehouses and/or production environments, in the field of autonomous navigation of floor conveyors and/or product tracking. In addition, embodiments may be used in the field of production, like managing workpieces and/or workpiece carriers, and for autonomous navigation of floor conveyors.

Thus, embodiments comprise a principle of an RFID multi-beam antenna for radio-frequency identification, that is reading out (passive) RFID transponders which can do with a single terminal for the reader. The multi-beam antenna exemplarily includes a quantity of antennas which are connected to a feed network. Different feeds for the antenna may be realized using the feed network so that different directional patterns result. Which feed is used at a certain point in time may be determined autonomously by the multi-beam antenna.

Although some aspects have been described in the context of a device, it is obvious that these aspects also represent a description of the corresponding method, such that a block or element of a device also corresponds to a respective method step or a feature of a method step. Analogously, aspects described in the context of or as a method step also represent a description of a corresponding block or item or feature of a corresponding device.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable. Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, wherein the computer program is stored on a machine readable carrier.

In other words, an embodiment of the inventive method is, therefore, a computer program comprising a program code for performing one of the methods described herein, when the computer program runs on a computer. Thus, a further embodiment of the inventive methods is a data carrier (or a digital storage medium or a computer-readable medium) comprising, recorded thereon, the computer program for performing one of the methods described herein.

A further embodiment of the inventive method is, thus, a data stream or a sequence of signals representing the computer program for performing one of the methods described herein. The data stream or the sequence of signals may, for example, be configured to be transferred via a data communication connection, for example via the Internet.

A further embodiment comprises processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein. Generally, in some embodiments, the methods may be performed by any hardware apparatus. This can be a universally applicable hardware, such as a computer processor (CPU) or hardware specific for the method, such as ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] L. Weisgerber, A. E. Popugaev, "Multibeam antenna array for RFID applications" in Proc. Of the 43$^{rd}$ European Microwave Conference (EuMC), Nuremberg, Germany, Oct. 6-10 2013, pp. 84-87

The invention claimed is:

1. An antenna device comprising:
   a radiating unit comprising a plurality of antennas, configured to emit a radio signal with a radiation pattern; and
   a calculator configured to generate and apply to the plurality of antennas a plurality of feed signals based on an identification signal provided in order to generate the radio signal;
   wherein the calculator is further configured to control the feed signals in a time-varying manner in order to emit the radio signal with a time-varying radiation pattern; and
   wherein the calculator comprises a terminal and is configured to acquire the identification signal from an external radio identification reader at the terminal.

2. The antenna device in accordance with claim 1, wherein the calculator comprises a storage configured to store information relating to a temporal succession of a change in the time-varying radiation pattern.

3. The antenna device in accordance with claim 1, wherein the calculator is configured to control the feed signals such that the radio signal is transmitted with one of a plurality of radiation patterns, each radiation pattern being associated to a sub-region of a detection region of the antenna device.

4. The antenna device in accordance with claim 1, wherein the plurality of antennas comprise mutually different radiation patterns, wherein the calculator is configured to derive a feed signal from the identification signal and apply same to the plurality of antennas such that a first radiation pattern of a plurality of possible radiation patterns of the plurality of antennas is acquired, wherein a second radiation pattern of the plurality of possible radiation patterns is not acquired.

5. The antenna device in accordance with claim 1, wherein the calculator is configured to apply a plurality of feed signals to the plurality of antennas such that these generate a plurality of mutually superimposing radio signals from the plurality of feed signals, superimposing comprising the radiation pattern, wherein the calculator is configured to control the plurality of feed signals such that the superimposing generated comprises a time-varying radiation pattern.

6. The antenna device in accordance with claim 1, wherein the calculator further comprises:
 a controllable distributor configured to receive the identification signal at a signal input and to provide a drive signal which is based on the identification signal at one of a plurality of signal outputs;
 a beam shaper comprising a plurality of signal inputs, wherein the plurality of signal inputs are each coupled to a signal output of the distributor and configured to receive a drive signal, wherein the beam-shaper is configured to provide feed signals at signal outputs based on a drive signal received, wherein each feed signal is associated to an antenna of the radiating unit, and wherein a radiation pattern of the radio signal at the radiating unit is associated to each signal input of the beam shaper;
 a distributor controller configured to control the controllable distributor in a time-varying manner so that the controllable distributor outputs the drive signal at time-varyingly changing signal outputs or with a time-varying signal characteristic.

7. The antenna device in accordance with claim 6, wherein the calculator is configured to control the controllable distributor such that it provides at least one drive signal at at least one signal output with a signal characteristic influenced by driving, wherein the signal characteristic relates to a phase, an amplitude or to one of a plurality of signal outputs at which the at least one output signal is provided.

8. The antenna device in accordance with claim 6, wherein the beam shaper comprises a first number of signal inputs and an equal first number of signal outputs and is implemented as a butler network.

9. The antenna device in accordance with claim 1, wherein the radiating element is configured to receive a response signal transmitted by a transponder device responsive to the radio signal, and wherein the calculator is configured to determine, based on evaluating the response signal and the radiation pattern with which the radio signal has been transmitted, a presence of the transponder device in a sub-region of a detection region of the radiating unit, wherein the sub-region is associated to the radiation pattern, and wherein the calculator is additionally configured to provide position information indicating the presence of the transponder device in the sub-region, at a signal output.

10. The antenna device in accordance with claim 9, wherein the calculator is configured to provide movement information indicating a movement of the transponder device from the sub-region to the other sub-region when the presence of the transponder device is determined at first to be in the sub-region and, subsequently, in the other sub-region.

11. The antenna device in accordance with claim 9, wherein the calculator comprises an internal radio identification reader for evaluating the response signal configured to correlate the presence of the transponder device which has transmitted the response signal responsive to the radio signal, with the sub-region, wherein the calculator is configured to control the radiation pattern of the radio signal such that the radio signal, in a subsequent time interval, is emitted with a radiation pattern associated to another sub-region.

12. The antenna device in accordance with claim 11, wherein the internal radio identification reader is configured to provide the identification signal.

13. The antenna device in accordance with claim 11, wherein the calculator is configured to provide the feed signals such that, in a first time interval, the radio signal is transmitted with a first radiation pattern and, in a second time interval which follows the first interval, is transmitted with a second radiation pattern,
 wherein the internal radio identification reader is configured to correlate a first response signal with a first sub-region associated to the first radiation pattern and to correlate a second response signal with a second sub-region associated to the second radiation pattern,
 wherein the calculator is configured to provide a position signal comprising information on a presence of a transponder device which transmits the response signal, in the first sub-region during the first time interval and, during the second time interval, in the second sub-region.

14. The antenna device in accordance with claim 13, wherein the calculator is configured:
 to determine, in the first time interval, a presence of at least one transponder device in a first sub-region of a detection region of the antenna device based on the response signal and to control the radiation pattern such that the radio signal is transmitted with a first radiation pattern associated to the first sub-region at least with a time slice of 50% and such that the radio signal is emitted, at least occasionally, with a radiation pattern associated to a second sub-region of the detection region which is arranged adjacent to the first sub-region in the detection region;
 to determine, in a second time interval which follows the first time interval, a presence of the at least one transponder device in the second sub-region and to control the radiation pattern such that the radio signal is transmitted with a second radiation pattern associated to the second sub-region at least with a time slice of 50% and such that the radio signal is emitted, at least occasionally, with the first radiation pattern associated to the first sub-region when the calculator does not determine the presence of a transponder device in the first sub-region;
 wherein the calculator is configured to provide the position signal in the first and second time intervals such that a direction of movement of the at least one transponder device in the receive region is allowed based on a temporal succession of the sub-region in which the transponder device is determined to be.

15. A radio identification system comprising:
 an antenna device in accordance with claim 9; and
 a communicator for receiving a data signal comprising information relating to a position of a transponder device detected by the antenna device.

16. The antenna device in accordance with claim 1, further comprising a terminal for receiving the identification signal from an external radio identification reader and a terminal for transmitting the response signal to the external radio identification reader.

17. The antenna device in accordance with claim 16, further comprising a generator for generating energy configured to couple out a signal portion from the identification signal and to generate electrical energy for operating the calculator based on the signal portion coupled out.

18. The antenna device in accordance with claim 1, further comprising a control signal input for receiving a control signal, wherein the calculator is configured to determine a temporal succession of a change in the radiation pattern based on the control signal and to change the radiation pattern based on the temporal succession.

19. A radio identification system comprising:
   an external radio identification reader;
   an antenna device in accordance with claim 1; and
   a communicator for providing a control signal comprising information relating to a temporal succession of the radiation pattern with which the radio signal is transmitted.

20. A method comprising:
   acquiring an identification signal from an external radio identification reader at a terminal;
   emitting a radio signal which comprises a radiation pattern using a radiating unit comprising a plurality of antennas;
   generating a plurality of feed signals based on the identification signal and applying the feed signals to the plurality of antennas in order to generate the radio signal; and
   time-varyingly controlling the feed signals so that the radio signal is emitted with a time-varying radiation pattern.

* * * * *